(12) United States Patent
Call et al.

(10) Patent No.: US 9,584,534 B1
(45) Date of Patent: *Feb. 28, 2017

(54) DYNAMIC FIELD RE-RENDERING

(71) Applicant: Shape Security, Inc., Palo Alto, CA (US)

(72) Inventors: Justin D. Call, Santa Clara, CA (US); Marc R. Hansen, Mountain View, CA (US); Xinran Wang, San Ramon, CA (US); Sumit Agarwal, Palo Alto, CA (US); Bryan D. Hanks, San Jose, CA (US)

(73) Assignee: SHAPE SECURITY, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,349

(22) Filed: May 1, 2015

Related U.S. Application Data

(62) Division of application No. 14/160,126, filed on Jan. 21, 2014, now Pat. No. 9,027,142.

(51) Int. Cl.
*H04L 29/06* (2006.01)
*G06F 17/24* (2006.01)

(52) U.S. Cl.
CPC ........ *H04L 63/1416* (2013.01); *G06F 17/243* (2013.01); *H04L 67/42* (2013.01)

(58) Field of Classification Search
CPC ............. G06F 21/14; G06F 2221/2125; G06F 21/606; G06F 21/577; H04L 63/1441; H04L 63/20

USPC .......................................................... 726/25
See application file for complete search history.

(56) References Cited

U.S. PATENT DOCUMENTS

| | | | |
|---|---|---|---|
| 7,117,429 B2 | 10/2006 | Vedullapalli et al. | |
| 7,480,385 B2 | 1/2009 | Weber | |
| 7,500,099 B1 | 3/2009 | McElwee et al. | |

(Continued)

FOREIGN PATENT DOCUMENTS

| | | |
|---|---|---|
| WO | WO9964967 | 12/1999 |
| WO | WO02088951 | 11/2002 |

(Continued)

OTHER PUBLICATIONS

Davido el al, "Understanding Split and Join", PerlMonks, http://www.perlmonks.org/?node_id=591988, Dec. 28, 2006, pp. 1-10.*

(Continued)

*Primary Examiner* — Harunur Rashid
(74) *Attorney, Agent, or Firm* — Hickman Palermo Becker Bingham LLP

(57) ABSTRACT

A computer-implemented method involves identifying an initial element for serving by a web server system to a client device and recoding the element by creating a plurality of different elements that each represent a portion of the initial element. The different elements are then served in place of the initial element. A response is received form the client device and has portions that correspond to the different elements, and a combined response is created by combining the received portions in a manner that corresponds to a manner in which the initial element was recoded to create the plurality of different elements.

21 Claims, 8 Drawing Sheets

(56) References Cited

U.S. PATENT DOCUMENTS

| | | | |
|---|---|---|---|
| 7,705,829 B1* | 4/2010 | Plotnikov | G06F 3/0236 |
| | | | 341/22 |
| 7,707,223 B2 | 4/2010 | Zubenko et al. | |
| 7,836,425 B2 | 11/2010 | Rubin et al. | |
| 8,020,193 B2 | 9/2011 | Bhola et al. | |
| 8,200,958 B2 | 6/2012 | Coppola et al. | |
| 8,225,401 B2 | 7/2012 | Sobel et al. | |
| 8,266,202 B1 | 9/2012 | Colton et al. | |
| 8,332,952 B2 | 12/2012 | Zhang et al. | |
| 8,527,774 B2 | 9/2013 | Fallows et al. | |
| 8,533,480 B2 | 9/2013 | Pravetz et al. | |
| 2004/0245525 A1* | 12/2004 | Yamazaki | G06K 19/07703 |
| | | | 257/66 |
| 2006/0075260 A1* | 4/2006 | Tucker | G06F 21/14 |
| | | | 713/190 |
| 2007/0011295 A1 | 1/2007 | Hansen | |
| 2008/0222736 A1 | 9/2008 | Boodaei et al. | |
| 2009/0099988 A1 | 4/2009 | Stokes et al. | |
| 2009/0249310 A1 | 10/2009 | Meijer et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2011/0131416 A1 | 6/2011 | Schneider | |
| 2011/0154021 A1 | 6/2011 | McCann et al. | |
| 2011/0296391 A1 | 12/2011 | Gass et al. | |
| 2012/0011262 A1 | 1/2012 | Cheng et al. | |
| 2012/0022942 A1 | 1/2012 | Holloway et al. | |
| 2012/0096116 A1 | 4/2012 | Mislove et al. | |
| 2013/0198607 A1 | 8/2013 | Mischook et al. | |
| 2013/0263264 A1 | 10/2013 | Klein et al. | |
| 2014/0040787 A1 | 2/2014 | Mills et al. | |
| 2014/0089786 A1 | 3/2014 | Hashmi | |

FOREIGN PATENT DOCUMENTS

| | | |
|---|---|---|
| WO | WO2004109532 | 12/2004 |
| WO | WO2008095018 | 8/2008 |
| WO | WO2008095031 | 8/2008 |
| WO | WO2008130946 | 10/2008 |
| WO | WO2013091709 | 6/2013 |

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages, Jun. 2012.

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

"Currie et al.,In-the-wire authentication: Protecting client-side critical data fields in secure network transactions. 2009 2nd International Conference on Adaptive Science & Technology, 978-1-4244-3523-4/09/$25.00 2009 IEEE, pp. 232-237".

Dougan et al., International Journal of Ambient Computing and Intelligence, Jan.-Mar. 2012, pp. 29-39.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-In-The-Browser Attacks," rsa.com [online] May 18, 2010 [captured Nov. 11, 2011]. Retrieved from the Internet: <URL:http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

\* cited by examiner

```
POST login.jsp HTTP/1.1
Host: example.com
Content-Type: application/x-www-form-urlencoded
Content-Length: 18

P1=S&P2=PS&P3&P4=A&
JYTr29y7rhKJY6=QmFzZTY0IGVuY29aW5nIHNjaGVtZXMgYXJlIGNvb
WlvbmxSIHVzZWQgd2hlbiB0aGVyZSBp

```
<html>
...
<form action="/action">
    <table>
        <tr>
            <td><span class="...">Field: </span></td>
        </tr>
        <tr>
            <td><input class="..." name="field1" type="text" value="value"/></td>
        </tr>
    </table>
</form>
...
</html>
```

FIG. 4A

```
<html>
...
<div class="container">
    <div class="innerdata inputstyle">
        <span class="a11">1</span><span class="a11">*</span><span class="a2">1</span><span class="a4">3</span>
        <span class="a2">e</span>
    </div>
    <div class="innerdata inputstyle">
        <span class="a1">v</span><span class="a4">r</span><span
        class="a11">B</span><span class="a6"></span>
    </div>
    <div class="innerdata inputstyle">
        <span class="a4">7</span><span class="a1">a</span><span
        class="a13">v</span><span class="a11">u</span>
    </div>
    ....
    <div class="innerdata inputstyle">
        <span class="a13">x</span><span class="a2"> </span><span
         class="a4">u</span><span class="a1">u</span>
    </div>
    ...
    <div class="inner">
        <input id="standin" class="inputstyle standin"
        length="20" type="text" onkeypress="update(event)"/>
    </div>
    ...
    <div class="spacer">
        <span class="inputstyle"> </span>
        <span class="inputstyle"> </span>
    </div>
    <div class="spacer">
        <span class="inputstyle"> </span>
        <span class="inputstyle"> </span>
    </div>
    ...
</html>
```

FIG. 4B

```
GET /action?field1=value HTTP/1.1
Host: example.com
Connection: keep-alive
Accept: text/html,application/xhtml+xml,application/xml;q=0.9,*/*;q=0.8
User-Agent: Mozilla/5.0 (Macintosh; Intel Mac OS X 10_8_3) AppleWebKit/537.36 (KHTML, like
Gecko) Chrome/27.0.1453.116 Safari/537.36
Accept-Encoding: gzip,deflate,sdch
Accept-Language: en-US,en;q=0.8
```

FIG. 4C

```
<html>
...
    <form action="\action" onsubmit="process(event,this)">
        <table>
            <tr>
                <td><span class="inputstyle">Field: </span></td>
            </tr>
            <tr>
                <td><input class="inputstyle" type="text" value="value"/></td>
            </tr>
        </table>
    </form>
...
</html>
```

FIG. 4D

```
<html>
...
    <form action="\action" onsubmit="process(event,this)">
        <table>
            <tr>
                <td><span class="inputstyle">Field: </span></td>
            </tr>
            <tr>
                <td><input class="inputstyle" type="text" value="value"</td>
            </tr>
        </table>
        <input type="hidden" name="f1"  value="HGvVUaM01N" />
        <input type="hidden" name="f2"  value="UufDenF2x2" />
        <input type="hidden" name="f3"  value="ONL6gY3bGc" />
        <input type="hidden" name="f4"  value="AP1Un6wQ0I" />
        <input type="hidden" name="f5"  value="U8LfdYg6GS" />
        <input type="hidden" name="f6"  value="eTT05yb7Pa" />
        <input type="hidden" name="f7"  value="aYf248R005" />
        <input type="hidden" name="f8"  value="J2044Yr907" />
        <input type="hidden" name="f9"  value="c9z4JD2QEe" />
        <input type="hidden" name="f11" value="O82oXbujes"/>
        <input type="hidden" name="f12" value="c5GI86T0XY"/>
        <input type="hidden" name="f13" value="4FpPTSEb75">
    </form>
...
</html>
```

FIG. 4E

```
GET /
action?f1=HGvVUaM01N&f2=UufDenF2x2&f3=ONL6gY3bGc&f4=AP1Un6wQ0I&f5=U8LfdYg6GS&f6=eTT05
yb7Pa&f7=aYf248R005&f8=J2044Yr907&f9=_c9z4JD2QEe&f11=O82oXbujes&f12=
c5GI86T0XY&f13=4FpPTSEb75 HTTP/1.1
Host: example.com
Connection: keep-alive
Accept: text/html,application/xhtml+xml,application/xml;q=0.9,*/*;q=0.8
User-Agent: Mozilla/5.0 (Macintosh; Intel Mac OS X 10_8_3) AppleWebKit/537.36 (KHTML,
like Gecko) Chrome/27.0.1453.116 Safari/537.36
Accept-Encoding: gzip,deflate,sdch
Accept-Language: en-US,en;q=0.8
```

DYNAMIC FIELD RE-RENDERING

TECHNICAL FIELD

This document generally relates to computer security.

BACKGROUND

Web content may contain application-like functionality that is interpreted and executed within a visitor's browser, or a similar application. Such functionality may include form fields and other user interface elements designed to collect input from a user. Although intended only for use by legitimate end users/visitors, user interface elements are susceptible to automation by other computer programs. For example, malicious applications such as "bots" may scan underlying applications for vulnerabilities (and report their findings to a central unlawful organization), may attempt automatically to determine passwords or other credentials for users on whose computers the bots are executing, and/or may intervene between users and legitimate web sites to intercept user information, by interrogating user interface elements, or by collecting user input as it is transmitted within the browser or other application, or at another layer, before the data is encrypted for transmission back to a server system.

Various approaches have been taken to identify and prevent such malicious activity. For example, some approaches install defensive software on client computers. Alternative approaches run various kinds of analysis tools on the transactions and/or network traffic on a server system to detect improper activity.

SUMMARY

This document describes systems and techniques by which web code (e.g., HTML, CSS, and JavaScript) is modified before it is served over the internet by a server system so as to make more difficult the exploitation of the server system by clients that receive the code (including clients that are infected without their users' knowledge). In certain implementations discussed below, an element served by a web server system is replaced, via an intermediary server system, with multiple elements that together provide the functionality of the initial element. For example, a user interface element such as a form field may be replaced by multiple fields that visually overlap each other (wholly or partially) when they are displayed in a browser, and that each receive a portion of the input provided by a user, such as each receiving one character from a multi-character string entered by the user. The result is thus functionally and visually equivalent to interaction that occurs in a normal manner, but it breaks up the data to prevent interception and interpretation of the data. The data may then be reassembled in an appropriate manner once it is transmitted back to the server system that served the code. In short, then, the initial element is replaced with a modified element that publishes the content to multiple hidden elements in complex and difficult-to-predict ways.

Additionally, or alternatively, a system can "overload" such elements by providing, either from the server system to the client, from the client to the server system, or both, data for and within fields that are not actually used by the system. Such actions of adding distracting information to a process further complicates the efforts of malicious code to determine what the original application is doing with the field.

Such features may be further incorporated into a system that uses an intermediary server system (or part of the web server system) to modify served code in other manners, such as by changing names of fields and functions (among other changes). The modifications may differ for different times that a web page and related content are served, whether to the same client computer or to different client computers. Specifically, two different users (or a single user in two different web browsing sessions) may be served slightly different code in response to requests for the same web resource (e.g., a web page for carrying out transactions for on-line banking), where the difference may be in implicit parts of the code that are not displayed so that the differences are not noticeable to the user or users. For example, the names that are served to a client device for various software objects may be changed in essentially random ways each time a page is served. A main purpose of such action is to create a moving target with the code, so that malicious code executing on the client computers cannot use predictability of the code in order to interact with the code in a malicious way.

Such systems can be provided with additional mechanisms that provide for detection of malicious activity, in addition to deflection of such activity. As one example, when the web code is modified as described above, it can also be supplemented with instrumentation code that executes on client devices to detect anomalous behavior on the client devices. For example, where names of objects are changed by an intermediary system, the instrumentation code may look for efforts by other code on a client to interact using the old names—i.e., malicious code that was developed without understanding that the web code would not be static over time. In addition to looking with interactions with outside applications, the instrumentation code may also be programmed to monitor changes to a document object model (DOM) for a served web page and to report changes that are made to the DOM, either periodically or when a change that is indicative of anomalous behavior is recognized by the instrumentation code.

As such, malicious activity can be both detected and deflected in relatively sophisticated manners by changing the environment in which executable code on the client device, such as JavaScript, operates (in addition to changing corresponding references in the HTML code).

The modification of code that is described in more detail below may be carried out by a security system that may supplement a web server system (an intermediary server system), which may intercept requests from client computers to the web server system and intercept responses from web servers of the system when they serve content back to the client computers (including where pieces of the content are served by different server systems). The modification, or recoding, may be of static code (e.g., HTML) and of related executable code (e.g., JavaScript) in combination. For example, the names of certain elements on a web page defined via HTML may be changed, as may references to items external to the HTML (e.g., CSS and JavaScript code). As one such, the name of a label may be changed from a name provided by a programmer to an essentially random name like $4@376&8*. Such renaming may occur by first identifying programmatically related elements across the different types of code that are to be served to the client computer (e.g., HTML, CSS, and JavaScript) and grouping such occurrences of elements for further processing (e.g., by generating flags that point to each such element or copying a portion of each such element). Such processing may occur by modifying each element throughout the different formats of code, such as changing a name in the manner above each time that name occurs in a parameter, method call, DOM operation, or elsewhere. The modified elements may then be placed into the code to be delivered to the client computer, by recoding the code that was sent from the web server system, and serving the recoded code. Such a process may be repeated each time a client computer requests code, and the modifications may be different for each serving of the same code.

As noted above, the techniques discussed here may be carried out by a server subsystem that acts as an adjunct to a web server system that is commonly employed by a provider of web content. For example, as discussed in more detail below, an internet retailer may have an existing system by which it presents a web storefront at a web site (e.g., www.examplestore.com), interacts with customers to show them information about items available for purchase through the storefront, and processes order and payment information through that same storefront. The techniques discussed here may be carried out by the retailer adding a separate server subsystem (either physical or virtualized) that stands between the prior system and the internet, as an intermediary server system. The new subsystem may act to receive web code from the web servers (or from a traffic management system that receives the code from the web servers), may translate, or recode, that code in random manners before serving it to clients (and by splitting certain elements into multiple parts), may receive responses from clients and translate them in the opposite direction, and then provide that information to the web servers using the original names and other data. In addition, such a system may provide the retailer, or a third party with whom the retailer contracts (e.g., a web security company that monitors data from many different clients and helps them identify suspect or malicious activity), with information that identifies suspicious transactions. For example, the intermediary subsystem may keep a log of abnormal interactions, may refer particular interactions to a human administrator for later analysis or for real-time intervention, may cause a financial system to act as if a transaction occurred (so as to fool code operating on a client computer) but to stop such a transaction in actuality, or to perform any number of other techniques that may be used to deal with attempted fraudulent transactions.

Various implementations are described herein using hardware, software, firmware, or a combination of such components.

In some implementations, a computer-implemented method can comprise identifying an initial data entry field in web content for serving by a web server system; recoding the data entry field into a plurality of different data entry fields that are arranged to be displayed on a client device that requested the content in a visually overlapping manner, and to automatically receive sequential content from a user of the client device in different ones of the plurality of different fields so that the input appears to the user as if it is being received in a single field; serving the web content with the plurality of different data entry fields in place of the initial data entry field; receiving from the client device a response that has a plurality of separate input elements that each include input for a portion of the initial data entry field; providing, to the web server system and in an element that is identified so as to match the initial data entry field, a response that combines the plurality of separate input elements into a single input element that represents input from a user at the client device.

These and other implementations can optionally include one or more of the following features. The element can be recoded by an intermediary server system that is separate from the web server system and intercepts web code served by the web server system to client devices and recodes the web code to interfere with attempts by malicious software to interact with the code. The method can further include recoding the element in a different manner for each of different requests from client devices for content that includes the element so as to interfere with attempts to determine functional operation of the web server system.

In some implementations, a computer-implemented method can include identifying an initial element for serving by a web server system to a client device; recoding the element by creating a plurality of different elements that each represent a portion of the initial element; serving the different elements in place of the initial element; receiving from the client device a response having portions that correspond to the different elements; and creating a combined response by combining the received portions in a manner that corresponds to a manner in which the initial element was recoded to create the plurality of different elements.

These and other implementations can optionally include one or more of the following features. The initial element can include determining that the initial element is a data input field for receiving input from a user of the client device. The initial element can include identifying a form and locating the initial element on the form. The different elements that are served and the portions that are received both correspond to particular different characters entered by a user of the client device into the data input field. Recoding the element can include creating a plurality of different form fields coded to be displayed in a visually overlapping manner so that data entered by a user is received by particular different ones of the different form fields but appears to a user of the client device as if it is being received in a single form field. The portions that correspond to the different elements in the received response can be received in an order that is different than an order that they were entered by a user of the client device. The portions that correspond to the different elements in the received response can include dummy portions that include content arranged to appear to be input by a user of the client device, but that is not input from the user of the client device. The initial element can be identified before a request from the client device for content that includes the initial element. The element can be recoded by an intermediary server system that is separate from the web server system and intercepts web code served by the web server system to client devices and recodes the web code to interfere with attempts by malicious software to interact with the code. The method can further include recoding the element in a different manner for each of different requests from client devices for content that includes the element so as to interfere with attempts to determine functional operation of the web server system.

In some implementations, a computer-implemented system executable on one or more processors using code stored on one or more non-transitory devices that are accessible to the one or more processor can include: a first interface arranged to receive web code served by a web server system; a code analyzer programmed to identify one or more particular elements in the received web code as being elements for seeking user input; a recoder arranged to rewrite the identified particular elements, so that an initial identified element is replaced by a plurality of separate elements that present a user interface that matches a user interface presented by the initial identified element; and a second interface arranged to provide to remote client devices the web code having the initial element replaced by the plurality of separate elements.

These and other implementations can optionally include one or more of the following features. The system can be further programmed to receive responses from client devices that have been served the web code, the received responses having portions that correspond to the plurality of separate elements in the provided web code, and can create a combined response by combining the received portions in a manner that corresponds to a manner in which the i element was recoded to create the plurality of different elements. Identifying the initial particular element can include determining that the initial particular element is a data input field for receiving input from a user of the client device. The different elements that are served and the portions that are received can both correspond to particular different characters entered by a user of the client device into the data input field. Rewriting the identified particular elements can include creating a plurality of different form fields coded to be displayed in a visually overlapping manner so that data entered by a user is received by particular different ones of the different form fields but appears to a user of the client device as if it is being received in a single form field. The portions that correspond to the plurality of separate elements in the received responses can be received in an order that is different than an order that they were entered by a user of the client device, and creating a combined response can include combining the received portions in a manner that corresponds to a manner in which the initial element was rewritten, to create the plurality of different elements. The system can be an intermediary server system that is separate from the web server system and that intercepts web code served by the web server system to client devices and rewrites the web code to interfere with attempts by malicious software to interact with the code. The system can be programmed to rewrite the elements in a different manner for each of different requests from client devices for content that includes the elements so as to interfere with attempts by third parties to determine functional operation of the web server system.

The features discussed here may, in certain implementations, provide one or more advantages. For example, the cloaking of a web site's operation may provide a mechanism to block malicious parties from interfering with users' legitimate interaction with the web site. Further interference by way of splitting elements into multiple pieces may provide additional assurance that malicious parties will not be successful in either interfering with legitimate use or surreptitious data collection from legitimate users. Moreover, the monitoring of code that is served may allow web site operators to identify threats more quickly, and to alter their operations so as to better deal with the threats. Such actions may be beneficial to operators of commercial and other web sites, and may provide them with confidence that their transactions are secure, and warnings about new threats.

Other features and advantages will be apparent from the description and drawings, and from the claims.

BRIEF DESCRIPTION OF THE DRAWINGS

FIG. 1D shows an example post with a user-entered value distributed across multiple fields.

FIGS. 4A-4F show examples of code for generating a multiplexed user interface element for a recoded web page.

Like reference numbers and designations in the various drawings indicate like elements.

DETAILED DESCRIPTION

Figure 1A:
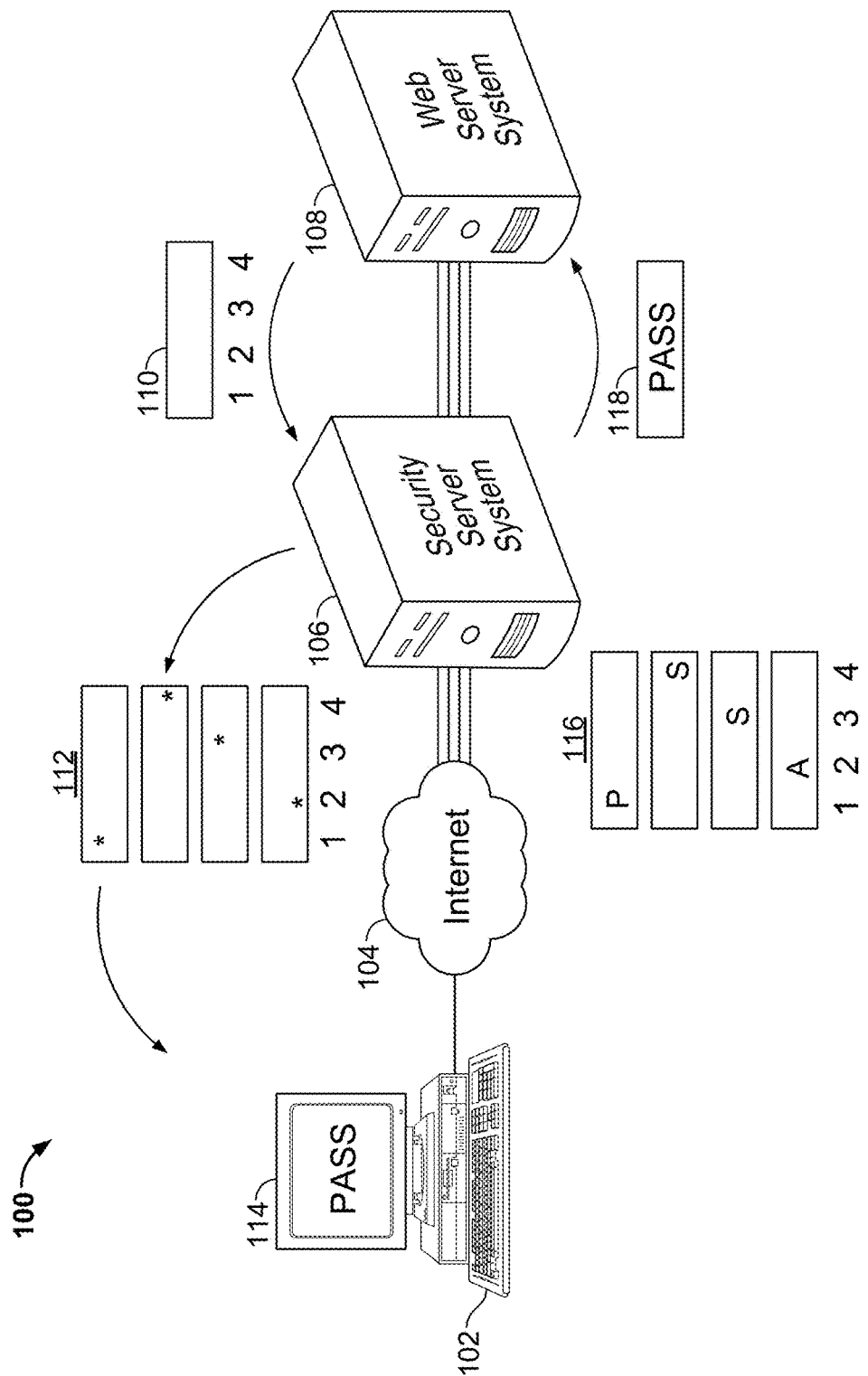
FIG. 1A depicts a schematic diagram of an example system for serving web code and monitoring actions of client computers.

This document discusses mechanisms for addressing computer fraud threats by recoding content that is served from a computer server system to computing clients. Those computing clients may be infected with bots or other malicious software, and the mechanisms discussed here are aimed at blocking efforts by such malicious software (malware) to take advantage of the client devices, the server system, or both. In particular implementations discussed below, web page elements, such as form fields, may be associated with multi-part (e.g., multi-character) inputs to be provided to the elements. Such elements may be recoded so as to split the parts of the multi-part inputs into separate elements, where such elements may be coded so that they are presented to a user in a manner as if they were the original multi-part element, such as by visually stacking (in a rendered web page) user interface elements. In other words, the additional security does not affect the essential function and presentation of the element. As one example, a field for accepting a user password may be split into multiple fields, one or more letters of the password may be received into each field as the user types, the letters may be transmitted out of sequence (i.e., not as an essentially continuous string) and even out of order back to a server system, and the password may be reassembled by the server system using an inverse of rules that were used to split up the relevant user interface element.

As an additional interference with attempts by malicious code to exploit served web resources, a number of extraneous resources may be generated and transmitted as a mechanism to misdirect the malicious code. In particular, multiple elements of a single element type may be served from a server system, and may have corresponding responses sent by a client device. In another approach, an element may be broken into sub-parts as described in the prior paragraph, and additional extraneous subparts may also be created. For example, for a three-character password, five fields may be created, and if a user types "ABC," fields may be returned as follows "F," "B," "A," "L," and "C." In such a situation, not only would malicious code have to determine that the field is bring broken up by character, the order that the characters are supposed to take, but also which ones of the characters are relevant. More complex approaches for such a simple example may also be taken, such as by adding a character to every other position to may a series of two-character strings to be sent, then adding two-character string, and also rearranging the returned elements. Thus, where the user types "ABC," the following may be transmitted (where the characters typed by the user are underlined for clarity here, but would not be flagged in any manner in an actual transmission): "CK," "NB," and "AB."

Both of these schemes may be part of a larger system for detecting and deflecting malicious actions by code on client computers that are served by code from the server system. For example, elements served by the server system may be changed in a variety of ways beyond those just discussed, and the changes may be different for each of the times a resource is served. In particular, the same web page element may be changed each time a web page is served, but the values may be different each time (including between page loads for different users and even different loads by the same user). As one particular example, the names of functions or variable may be changed, such as by changing names assigned by a programmer to essentially random names, additional corresponding changes may be made to elements that interact with the originally-changed element, and to elements that provide feedback from the client back to the server system. Corresponding inverse transformations may then be applied to data received back from the client, and the resulting data may be provided to the main server system that served the web page or other resource or resources (and multiple different server systems may each be provided with their portion of the relevant data).

In addition, all such transformed, or recoded, code may be supplemented with instrumentation code that executes on the client devices to detect and report anomalous behavior. For example, if code external to the served code attempts to communicate using names of elements that are in the original code, but not in the recoded code, that would be a sign that the interacting code is assuming improperly that the code is fixed. Such action is anomalous and may be indicative of a bot trying to perform a Man in the Browser attack. The instrumentation code may report the occurrence of, and meta-data representative of, such anomalous activity and may submit such data to a central monitoring service through the internet. The monitoring server may be associated with the service that recoded the elements, and may analyze reports across a large number of clients to identify clusters of abnormal behavior and then determine whether instances in such clusters are likely to be benign or instead malicious.

FIG. 1A depicts a schematic diagram of an example system 100 for serving web code and monitoring actions of client computers. In general, the system is directed to presenting information from a web server system 108 in a manner that interferes with the ability of third-parties and third-party software to exploit the web server system 108 and an organization that operates the web server system 108. Examples of such operators include on-line retailers and on-line banking systems. Examples of such illegitimate exploitation include efforts to intercept user passwords and other credentials (e.g., social security numbers). The operations described here involve splitting a served element into multiple parts and sending those parts in a multiplexed manner to a client computing device 102, and then receiving a multiplexed response of multiple parts, which can be reassembled in a manner that corresponds to the manner in which the sent items were split apart. By splitting up the element, and sending parts over or back in a multiplexed manner, the system 100 may make it more difficult for malicious parties to identify what is occurring at the client computing device 102.

In the described example, the system 100 operates by providing modified or recoded web code to the client computing device 102, where the modifications are relative to a web page that would normally be served to the client computing device without additional security measures applied. Web code may include, for example, HTML, CSS, JavaScript, and other program code associated with the content or transmission of web resources such as a web page that may be presented at a client computing device 102 (e.g., via a web browser or a native application (non-browser)). The system 100 can detect and obstruct attempts by fraudsters and computer hackers to learn the structure of a website (e.g., the operational design of the pages for a site) and exploit security vulnerabilities in the client device 102. For example, malware may infect the client device 102 and gather sensitive information about a user of the device, or deceive a user into engaging in compromising activity such as divulging confidential information. Man-in-the-middle exploits are performed by one type of malware that is difficult to detect on a client device 102, but can use security vulnerabilities at the client device 102 to engage in such malicious activity.

The system 100 can serve web code that is modified from its original state and additionally supplemented with code that provides other functionality, such as instrumentation code. The instrumentation code may execute on the client device 102 in order to monitor operation of other code on the device and to report back to a security server system 106 when anomalous activity has occurred. The modifications may be performed to deflect malicious activity in various manners. For example, the web server system 108 or security server system 106 may modify portions of the served code in different manners each time a web resource, such as a web page or a defined portion of a web page (e.g., code for a log-on function), is served. Such repeated modification of the served code may serve as a moving target for malware that attempts to interact with the served code. It may also cause failure in those attempts to interact (e.g., because the malware makes calls to names of items, where those names have been changed via the modification process) such that the instrumentation code may detect the failures and make corresponding reports to the security server system.

The modifications may also include actions that involve breaking certain code elements into multiple pieces so that malware would need to reassemble the pieces (and do so in the right order) to even begin determining what the code is doing—and to insert itself into the interaction with such code and the system 100. For example, a data input field in an HTML table may be split into multiple subsequent fields, where each subsequent field is dedicated to a particular character position for the original field. Those subsequent fields may be coded so that they are displayed layered over or adjacent to each other so that a user of a client device 102 who enters data into the field is presented with visual feedback that makes it look like each subsequently-entered character is to the immediate right of the prior character even if those two characters are in different ones of the subsequent fields. The data entered by the user may then be returned to the security server system in a manner that allows the security server system 106 to assemble the entered data in the proper order and pass it to the web server system 108 for processing.

Such recoding of a particular user interface element with multiple corresponding user interface elements is shown with respect to particular data transfers shown in FIG. 1A. For example, data structure 110 is initially passed from the web server system 108 to the security server system 106 (or may be intercepted by the security server system 106). In this simplified example, the data structure is a field for receiving user text entry, where the field has a length of four characters. The data structure 110 would generally be served along with various other code, such as other HTML and JavaScript code for generating an interactive web page. For example, the data structure 110 may be intended to be a field in which a user who has requested a web page may enter his or her (short) password, such as for completing a retail or banking transaction.

The various re-coding modifications to the served code may be made in references from one part of the code to another part, and be made consistently across HTML, CSS, and JavaScript. For example, the following string indicate HTML before and after alternation using a random number for textual replacement:

<form action="login.jsp" method="post" name="Login">
  <input type="text" id="lastname_id" name="lastname">

Re-coded format:

<form action="login.jsp" method="post" name="imp0q6wNm">
  <input type="text" id="b24mpqdfKX" name="aSkFjp5x1Y">

In other examples, basic text may be altered by the system to obfuscate what it is and to interfere with analysis by malware. For example, a label for a form may initially be served as "Last Name:" and can be recoded as:

La<!-QaXbdYrg→st N<script>document.write("am");</script>e:

This text-based polymorphism approach may prevent attackers from determining the topic of a field from the anchor text that accompanies the field or from programmatically locating the field at all using the surrounding text as a clue to a field's location and function. In this example, JavaScript and HTML comments are used to obfuscate the anchor text. Generally, text polymorphism would serve as a supplement to the reference polymorphism, though could be the sole form of polymorphism for certain implementations.

Notably, not all text should be obfuscated in these manners. For example, in certain implementations, it may be beneficial to allow a website to be more readily indexable (and thus searchable) by search engines, so that certain text may be skipped by the techniques discussed here. For example, certain types of HTML labels may be identified by a system that performs re-coding of web content and re-coding of labels on a blacklist may be avoided.

To provide for greater modularity and performance parity in implementation, a security server system 106 is provided separate from the web server system 108, and transforms data structure 110 into data structure 112 (along with doing a large number of other things). In this example, data structure 112 is a transformation of data structure 110, where each of the four characters for the field has been replaced by a separate field, where each of the subsequent fields takes one character. As shown, the fields are also not transmitted in character order, but are instead transmitted and arranged in the code in the order of characters 1, 4, 3, and 2. Such ordering of positions in the fields may be achieved in a variety of ways, and generally, security server system 106 will need know the order in which the client device 102 was instructed to handle the fields if it is to properly assemble data that is returned by the client device 102.

The security server system then transmits the transformed elements to the client device 102 over the internet 104 (and/or other networks). Such transmission may be encrypted or otherwise protected to further prevent malicious interference. The security server system 106 may be provided with information of the client device 102, such as an IP address, and the security server system 106 may serve the content so that its existence is not made known to the client device 102. In other implementations, the recoding of the content may occur without first creating physical code, such as when the web server system 108 is itself programmed to carry out actions to thwart malicious parties. For example, code for certain elements may be analyzed by a system and replaced with code that generates multiple fields (where the original code had only one field), so that, once the base code is affected, every request for the code to the web server system 108 can be served with that code, and the recoding need not occur for every individual request for content from a client device 102. In certain implementations, such "one time" recoding may occur for some elements, while other elements can be recoded each time or most of the times they are served, and yet other elements may be recoded into a finite number of different modified elements (e.g., 16 different choices), and a particular one of finite number of recoded elements may be selected for each serving (so as to limit the volume of recoding that needs to occur, but still provide an adequate degree of a moving target for malicious code to be challenged).

The client device 102 then renders the data structure 112 (along with other content provided by the security server system 106 that may have been wholly or partially recoded from code that was received from web security system 108). Such rendering may involve generating a user interface display 114 on the client device 102 that includes a form and fields for a user of the client device 102 to fill in on the form. Display 114 shows the user having entered "PASS" as a passcode for a transaction. Such entry may have occurred by the user positioning a cursor over what looked like a single field to the user, but in reality was two or more separate fields that were visually stacked and/or adjacent to each other, so that different ones of the characters enter by the user were received by different ones of the form fields in the recoded code (which are the multiple web elements created from a single field element for the original page).

Such characters are shown schematically by four different fields 116 being passed in a response from client device 102 to security server system 106. Here, the field is for entry of a user password, and the example password for this user is PASS. To improve security, the fields are pass out of the order in which the user entered data into them, so that the ordering of characters for the user's password as those characters are passed in the fields of a network communication are P, S, S, and A. Although not shown, additional similar fields may be provided as "dummy" fields that hold data that the user did not enter, or that hold variations of or copies of the data the user entered. Such dummy fields may further confuse malicious software that attempts to analyze the transmitted data.

The security server system 106 then reorders the received characters into the proper order expect by the web server system 108, e.g., PASS. Such reordering may occur by the security server system 106 consulting information that identifies what rule was used to reorder the initially-served data and to apply an inverse to that rule, in effect. Such determination may be made by consulting information stored on the security server system 106 (such as a mapping index) and/or received from the client device 102. The reverse transformation information may be provided by the client device 102, for example, where the system 106 makes different transformations each time it serves code, and thus the system 106 can avoid having to keep track of the state of numerous transaction by simply providing such state information (e.g., a code that is used to determine the parameters for the reverse transformation) to the client device 102 and then receiving it back from the client device 102 when the client device 102 has performed a relevant operation that requires access to the web server system 108.

In this manner, then, the system 100 allows an existing web server system 108 to be supplemented with a security server system 106, that can recode or rewrite code that is served from the web server system 108 so as to better hide the operation of certain served elements, and particularly data input fields, and can handle responses that involve interaction by users with those elements. As a result, a system may be provided in certain implementations to increase security without having to make major changes to the web server system 108, in that the web server system 108 can continue serving its regular code.

Such splitting and reordering of certain elements can occur along with other transformations made by the security server system 106 so as to both deflect and detect interaction with the served code by malicious or other code. Such additional features are discussed below with respect to FIG. 2. Particular splitting transformation operations are shown next in FIGS. 1B to 1D.

Figure 1B:
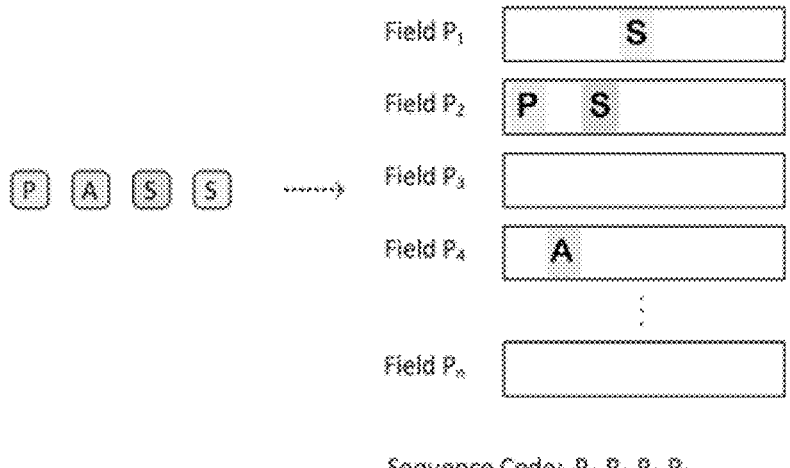
FIGS. 1B and 1C depict stacking of display elements for a web form.
Figure 1C:
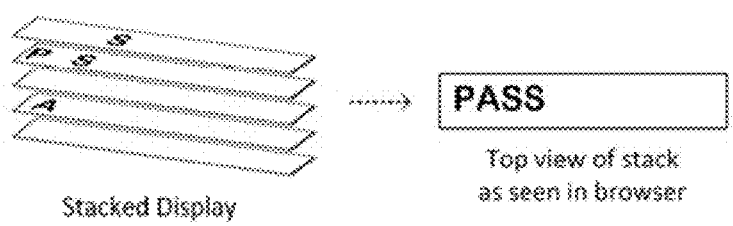

For example, FIGS. 1B and 1C depict stacking of display elements for a web form. In FIG. 1B, the elements are shown in a flat configuration. Here, a security intermediary has determined that a data input element has n elements to it, such as n possible characters that are allowed in a user password. Such recognition may occur by analyzing web code served by a web server system for particular element names and parameters. The element may then be rewritten in the form of a plurality of separate elements. In this example, each of the separate elements corresponds to one character of the data entry, though other rearrangements may be made, such as for each pair of characters or every other character. The rewritten field may then be arranged so that, once a character is received in one field, the focus of a browser or similar application presenting the fields may shift to the next relevant field. Here, the focus is programmed to move between fields in order 2, 4, 2, 1, as shown by the characters in those fields and positions of the characters, and also be a separate sequence code. As indicated above, the sequence code may be provided by the security system to the client device (e.g., after encoding it) and may then be decoded when the text is received back at the security system, e.g., using a key held by the security system.

FIG. 1C further shows how the fields would be visual overlaid with each other when displayed by a browser or other application. In this example, the fields are all shown as having the same length and overlapping totally, though they could be adjacent to each other in position also. In any event, from such positioning and presentation, the user experience is not different or not substantially different than if the original code from the web server system were served.

FIG. 1D shows an example post with a user-entered value distributed across multiple fields. In this example, characters of a single field are split between multiple name-value pairs. The constant required to reassemble the sequence was determined in advance and provided to the client device in an encrypted manner and then embedded in the return post as a hidden field that is shown in the last two lines.

Figure 2:
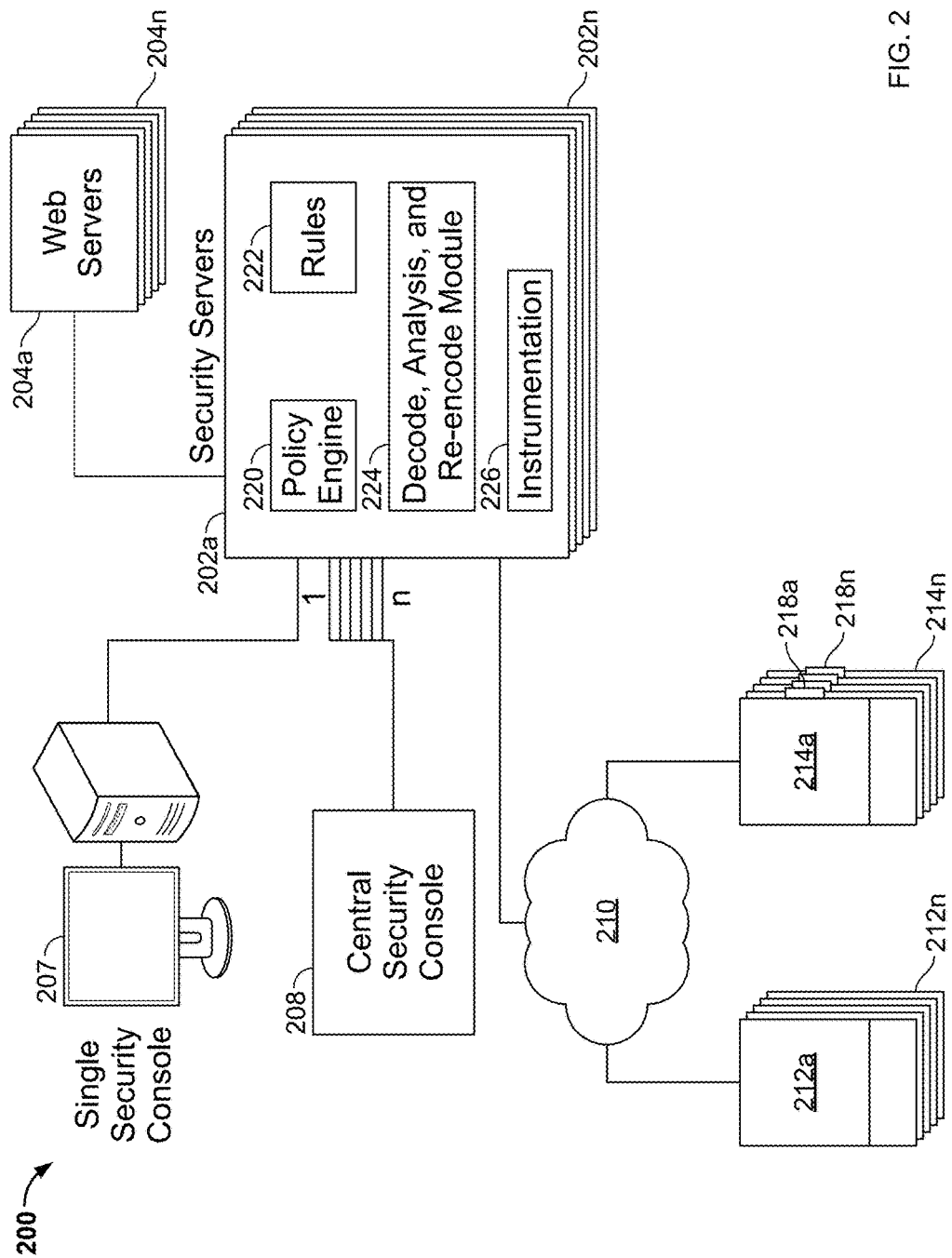
FIG. 2 is a schematic diagram of a system for performing deflection and detection of malicious activity with respect to a web server system.

FIG. 2 is a schematic diagram of a system for performing deflection and detection of malicious activity with respect to a web server system. The system 100 may be the same as the system 100 discussed with respect to FIG. 1A, and is shown in this example to better explain the interrelationship of various general features of the overall system 200, including the use of instrumentation code for detection and deflection that is discussed in greater detail throughout this document.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie or other hidden parameter that is saved at the relevant client computer. The client computer may then pass that cookie or other hidden parameter data back when it passes the information that needs to be decoded back to its original status. With the cookie or other hidden parameter data, the system 202 may use a private key or shared secret to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3A:
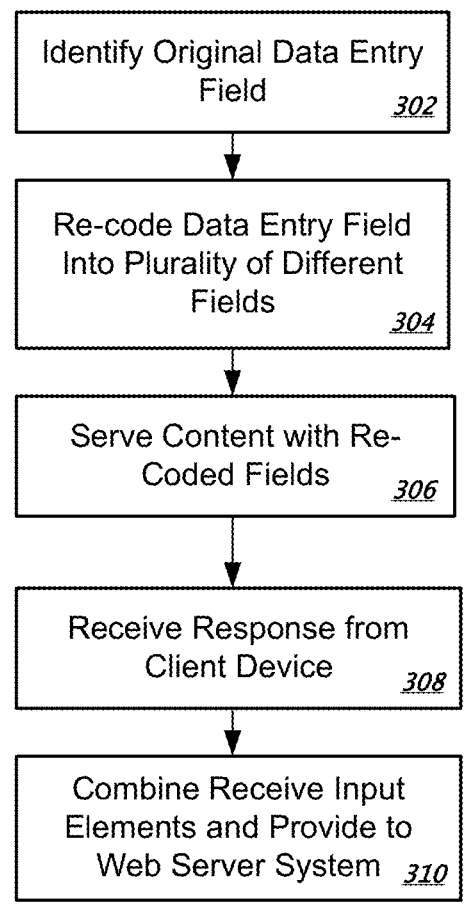
FIG. 3A is a flow chart of a process for splitting and recombining a served element for a web page.

FIG. 3A is a flow chart of a process for splitting and recombining a served element for a web page. In general, the process involves a security server system identifying one or more elements in code, such as HTML or other Web code to be split into multiple similar elements so as to interfere with the ability of malicious code in determining how a website is organized and functional matters, and plus to block the malicious code from reverse engineering the website for bad purposes.

The process begins a box 302, where an original data entry field in Web content for serving by a Web server system is identified. Such identification may occur by a security server system being programmed with particular element names that are amenable to processing for security purposes. Such element names may be relevant to changing of the names to more random alphanumeric representations, such as discussed above with respect to FIG. 2, or may be elements such as user data entry fields that may be split in the manners discussed above. When such fields are identified, the process may also identify parameters for those fields, such as the length of a field in terms of the number of characters a user may enter into the field, and restrictions on the type of information that may be entered in the field. The identification of the element and such parameters may then be used to replace the element in the Web code with a plurality of other elements that have essentially the same functional make up but that are coded substantially differently.

At box 304, the data entry field is re-coded into the plurality of different data entry fields. Those data entry fields are arranged to be displayed on a client device that requested the content from the Web server system. The arrangement of the display is established so that the fields overlap in a way that a user of the client device is presented with the same user interface that he or she would have seen if the security server system had not intercepted the served code. At the same time, the fields are arranged so that sequential content received from a user of the client device in different ones of the different fields are received into the fields in a knowable order. For example, as described above, a sequence code may be provided along with the Web code so that the rendered webpage may accept user input in the proper order.

At box 306, the Web content with the plurality of different data entry fields is served in place of the original data entry field and original Web code. As noted, additional alterations may also be made to the Web code for greater security purposes. At box 308, a response is received from the client device to which the altered Web code was served. The response includes a plurality of separate input elements that each include input for a portion of the original data entry field. For example, each data input element may contain data for one or more characters of a password, but not the entire password. In addition, the sequence code may be received with such information or separately from such information but is part of a combined operation. The sequence code may be decrypted and the decrypted code may be used to order the characters or other information in the plurality of separate input elements. Such information may then be assembled into a form that matches what the user actually provided as input.

At box 310, the process provides to the Web server system a response that combines the plurality of separate input elements into a single input element. The responses also formatted with identification that allows the Web server system two match the response with the Web code that was originally served by the Web server system.

In this manner then, the process allows greater security in the serving of Web code or similar code across a network to clients that may have been compromised by malicious code, such as Mal ware. Particular implementations may occur in form fields and other fields that receive user input, in that the input may be scrambled and made more difficult for intervening malicious software to decode and use in an improper manner.

In certain instances, the returned data will not recombine properly when the inverse action is used in comparison to the re-coding that was used to send the data. Such a problem may occur when malware (e.g., as a Man in the Middle attack) attempts to change the data entered by a user, and to enter false data into a field. In such a situation, the security system may identify the response as a potential anomaly, and may forward the received data, or may generate and send data that characterizes the received data. Such data may be received by an analysis system that may determine if the anomaly resulted from invalid interaction with the web code (as opposed to some error in the code or some invalid interaction by the computer user). The analysis system may also receive data that characterizes the status of the particular client computer, and may use such data to determine other computers that have had similar anomalous behavior, and then to identify whether such behavior is malicious or benign, and to formulate a strategy for addressing the behavior.

Figure 3B:
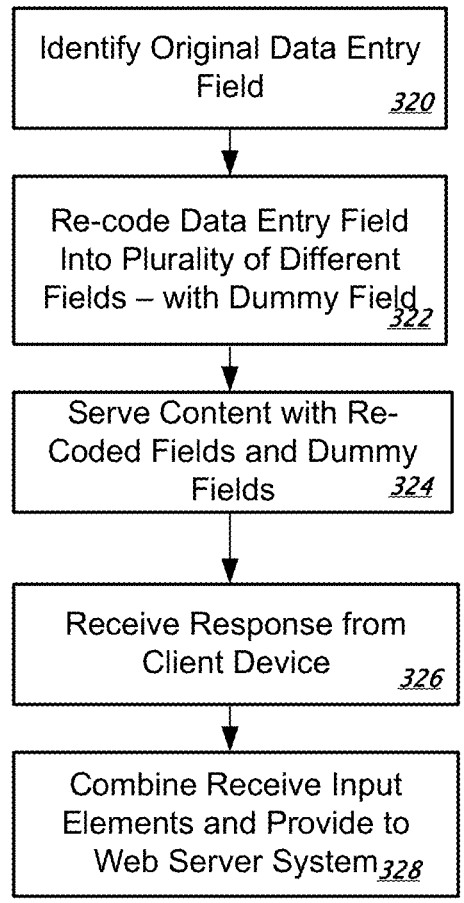
FIG. 3B is a flow chart of a process for overloading a session with distractor elements for a web page.

FIG. 3B is a flow chart of a process for overloading a session with distractor elements for a web page. In general, the process involves providing additional fields in the form of dummy fields that may be used to confuse malicious code that attempts to intercept communications between a server system a client device, such as a man in the middle application on the client device. The process begins a box 320, where an original data entry field is identified in Web content that is for serving by a Web server system. Such identification may occur for example by intercepting code that is already being served by the Web server system. Alternatively, the identification may occur by analyzing Web code that has yet to be served and providing instructions associated with the future serving of that Web code. The identifying may involve identifying situations in which it may be useful to provide distracting data for communications between the server system and client devices.

At box 322, the data entry field is recoded into a plurality of different data entry fields, where at least one of the fields is a dummy field. A dummy field in this example is a field that is not meant to carry data or portions of data entered by a user, but is instead meant to carry data whose goal is to distract interfering malicious software. The dummy field may be populated initially by the server system so that its value is static. Alternatively, the value of the dummy field made change based on the information that a user enters for other fields, where those other fields may be created by splitting an original field into multiple parts as described above in FIG. 3A.

At box 324, the Web content including the dummy fields or field is served to the client device that requested the Web content. At box 326, the server system that serves the content receives on the client device a response. That response may include data in one or more dummy fields, in addition to a real field for the input, or multiple real fields that each contained part of the input from the user. Where the real fields contain only part of the input, the process may also need to identify a sequence code for reassembling the part of the real fields into the original form that was intended by a Web server system.

At box 328, the security system provides to the Web server system an element that is identified so as to match the input expected by the Web server system from a user. For example, the information provided the Web server system may include field names or other parameters to identify the particular field into which the user believed he or she was providing their input, or in other words, the original field received by the security server system and recoded or rewritten by the security server system. The security server system does not provide the Web server with data from any of the dummy fields, however. As noted with respect to FIG. 3A, where an invalid set of data (one that cannot be recombined in the manners discussed here) is submitted, it may be analyzed by a broader system to identify if the failure was the result of anomalous behavior of other code on the client computer, whether the behavior is similar to that seen on other client devices, and to identify whether it is benign or instead malicious.

FIGS. 4A-4F show examples of code for generating a multiplexed user interface element for a recoded web page. The examples use form elements to indicate types of alternations that may be made, though other sorts of elements may be similarly affected. For example, to better interfere with client-side malware, (a) multiple non-hyperlink elements may replace a hyperlink element, where they are functionally equivalent to the original element; (b) hyperlinks may be generated to have parameters that are divided in a manner that does not map to the parameters that are expected by the original web application; and (c) multiple hyperlinks may be created and served but only one of them can be visible to a user and the others can be hidden by mechanisms that are not easy to detect and associate with the user's view, when looking just at the web code.

FIG. 4A shows an unmodified user interactive element, i.e., that would exist before visual stacking transformations have been applied. Here, a user input is defined by a class that has a particular field name, and a text field type. The effect, as viewed by a user of a browser that renders the code, is the display of a data input form with a label above a data input box of "Field:", and a default value in the box of "value."

FIG. 4B shows a modified display element, where the modifications are made to the content according to techniques like those discussed above, so as to cause visual stacking to be applied to the element when it is rendered on a web browser. Here, the style information on the DIV block elements and the SPAN inline elements has been changed and added so as to cause the content to be stacked visually on top of each other, and for some characters not to be displayed. The result of such a re-coding is the same visual presentation as the code for FIG. 4A. When the content is rendered, the client browser receives key events on the stand-in input field and responds so as to create an illusion that a user is interacting with a normal input field. In reality, the browser (or other client side runtime) rewrites the entire contents of the container DIV periodically. The contents of the container DIV may be arbitrarily complex within the limits of what is practical to transmit, download, and render within a browser.

When the user then submits the data input into the field, the browser provides the data back to the server system that sent the content. In the example, the value of the field, "value," could be transmitted over HTTP with the name field1 or as another single, but remapped, field name While DIVs and SPANs are used in this example, other elements, and particularly other block and inline elements can be reformatted using CSS.

FIG. 4C shows an original request that is an example of a request that could be submitted in response to user interaction with the rendered content from FIG. 4A. As such, the request is a post (though not necessarily an HTTP POST) that occurs before field multiplexing is performed on the submitted data. A simplified example of re-rendering the content is shown in FIG. 4D (which is also pre-multiplexing), where notably, the field parameter name has been removed. A JavaScript application for re-coding the content may be used to distribute user input into multiple fields that are hidden from the user's view when the content is rendered (e.g., by a Web browser), and that contain random or arbitrary data that is written into the DOM before the form is submitted. Here, the re-coding may occur within the process( . . . ) function.

FIG. 4E shows one example of how the DOM can be represented when the form is submitted, which is after multiplexing has been performed on the data. The actual user-entered characters are surrounded by and masked by the arbitrary characters. In this example, user data is placed at each third character. In practice, the distribution pattern of the real characters would be more varied.

FIG. 4F shows a modified request that may be transmitted, in the form of a post (though not necessarily an HTTP POST) after field multiplexing has been performed on the data. In this example, the characters are placed in a lengthy string, with the user-entered characters again buried among other arbitrary characters that may be discarded by a server that receives the request and has knowledge of the manner in which the request was encoded (e.g., by saving an indicator that identifies the process that is associated with the process that was used to re-code the content).

A checksum or other data integrity check may also be applied to the request. The checksum may be used to prevent malware from blindly or fraudulently submitting values, where such values will cause a mismatch with the checksum value. The checksum may be especially useful in mitigating DDoS attacks.

Figure 5:
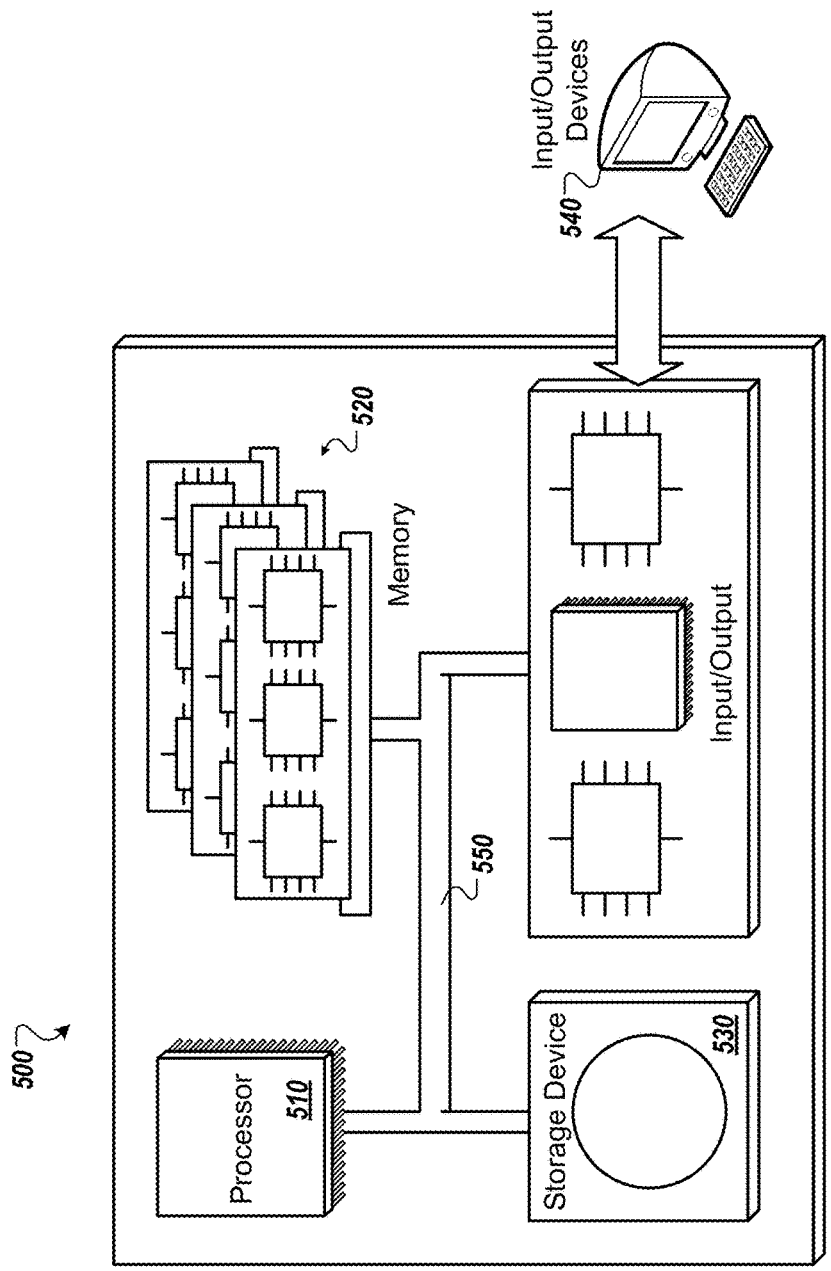
FIG. 5 is a block diagram of a generic computer system for implementing the processes and systems described herein.

FIG. 5 is a schematic diagram of a computer system 500. The system 400 can be used for the operations described in association with any of the computer-implemented methods described previously, according to one implementation. The system 500 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    identifying, in web content that a web server system has made available for serving to a client device, an initial data entry field that is arranged to receive user-entered data for a first parameter of the web server system;
    recoding the web content by replacing the initial data entry field with a plurality of different data entry fields that are each arranged to receive a different portion of user-entered data for the first parameter and wholly or partially visually overlap each other when displayed;
    serving, to the client device, the recoded web content including the plurality of different data entry fields-in place of the initial data entry field;
    receiving, from the client device, a response that includes separate portions of user-entered data for the first parameter from a user of the client device, wherein the separate portions of user-entered data respectively correspond to data received in the plurality of different data entry fields; and
    creating a combined response that identifies an entirety of user-entered data for the first parameter by combining the separate portions of user-entered data from the received response in a manner that corresponds to a manner in which the web content was recoded to replace the initial data entry field with the plurality of different data entry fields;
    wherein the method is performed by an intermediary server system.

2. The computer-implemented method of claim 1, wherein identifying the initial data entry field comprises determining that the initial data entry field is a data input field for receiving input from the user of the client device.

3. The computer-implemented method of claim 2, wherein identifying the initial data entry field comprises identifying a form that is present in the web content and locating the initial data entry field on the form.

4. The computer-implemented method of claim 2, wherein the plurality of different data entry fields that are served and the portions that are received both correspond to particular different characters entered by the user of the client device for the first parameter of the web server system.

5. The computer-implemented method of claim 2, wherein recoding the web content comprises creating the plurality of different data entry fields coded to be displayed by the client device in an at least partially visually overlapping manner so that data entered by the user is received by particular different ones of the plurality of different data entry fields but appears to a user of the client device as if it is being received in a single data entry field.

6. The computer-implemented method of claim 5, wherein the separate portions of user-entered data for the first parameter are arranged in the received response in an order that is different from an order in which the separate portions were entered by the user of the client device.

7. The computer-implemented method of claim 5, wherein the separate portions of user-entered data for the first parameter in the received response include at least one dummy portion that identifies content arranged to appear as data entered by the user of the client device, but that is not data entered by the user of the client device.

8. The computer-implemented method of claim 1, comprising identifying the initial data entry field before a request is made from the client device for the web content that includes the initial data entry field.

9. The computer-implemented method of claim 1, comprising recoding the initial data entry field by an intermediary server system that is separate from the web server system, wherein the intermediary server system is configured to intercept web content served by the web server system to client devices and to recode intercepted web content to interfere with attempts by malicious software to interact with the web content at the client devices.

10. The computer-implemented method of claim 1, further comprising recoding the web content in a different manner for each of different requests from client devices for the web content that includes the initial data entry field so as to interfere with attempts to determine a functional operation of the web server system.

11. One or more non-transitory computer-readable devices having instructions stored thereon that, when executed by one or more processors, cause performance of operations comprising:
    identifying, in web content that a web server system has made available for serving to a client device, an initial data entry field that is arranged to receive user-entered data for a first parameter of the web server system;
    recoding the web content by replacing the initial data entry field with a plurality of different data entry fields that are each arranged to receive a different portion of user-entered data for the first parameter and wholly or partially visually overlap each other when displayed;
    serving, to the client device, the recoded web content including the plurality of different data entry fields in place of the initial data entry field;
    receiving, from the client device, a response that includes separate portions of user-entered data for the first parameter from a user of the client device, wherein the separate portions of user-entered data respectively correspond to data received in the plurality of different data entry fields; and
    creating a combined response that identifies an entirety of user-entered data for the first parameter by combining the separate portions of user-entered data from the received response in a manner that corresponds to a manner in which the web content was recoded to replace the initial data entry field with the plurality of different data entry fields;
    wherein the performance of operations is done by an intermediary server system.

12. The one or more non-transitory computer-readable devices of claim 11, wherein identifying the initial data entry field comprises determining that the initial data entry field is a data input field for receiving input from the user of the client device.

13. The one or more non-transitory computer-readable devices of claim 12, wherein identifying the initial data entry field comprises identifying a form that is present in the web content and locating the initial data entry field on the form.

14. The one or more non-transitory computer-readable devices of claim 12, wherein the plurality of different data entry fields that are served and the portions that are received both correspond to particular different characters entered by the user of the client device for the first parameter of the web server system.

15. The one or more non-transitory computer-readable devices of claim 12, wherein recoding the web content comprises creating the plurality of different data entry fields coded to be displayed by the client device in an at least partially visually overlapping manner so that data entered by the user is received by particular different ones of the plurality of different data entry fields but appears to a user of the client device as if it is being received in a single data entry field.

16. The one or more non-transitory computer-readable devices of claim 15, wherein the separate portions of user-entered data for the first parameter are arranged in the received response in an order that is different from an order in which the separate portions were entered by the user of the client device.

17. The one or more non-transitory computer-readable devices of claim 15, wherein the separate portions of user-entered data for the first parameter in the received response include at least one dummy portion that identifies content arranged to appear as data entered by the user of the client device, but that is not data entered by the user of the client device.

18. The one or more non-transitory computer-readable devices of claim 11, wherein the operations comprise identifying the initial data entry field before a request is made from the client device for the web content that includes the initial data entry field.

19. The one or more non-transitory computer-readable devices of claim 11, wherein the operations comprise recoding the initial data entry field by an intermediary server system that is separate from the web server system, wherein the intermediary server system is configured to intercept web content served by the web server system to client devices and to recode intercepted web content to interfere with attempts by malicious software to interact with the web content at the client devices.

20. The one or more non-transitory computer-readable devices of claim 11, wherein the operations further comprise recoding the web content in a different manner for each of different requests from client devices for the web content that includes the initial data entry field so as to interfere with attempts to determine a functional operation of the web server system.

21. A computing system comprising:
one or more processors; and
one or more non-transitory computer-readable devices having instructions stored thereon that, when executed by the one or more processors, cause performance of operations comprising:
identifying, in web content that a web server system has made available for serving to a client device, an initial data entry field that is arranged to receive user-entered data for a first parameter of the web server system;
recoding the web content by replacing the initial data entry field with a plurality of different data entry fields that are each arranged to receive a different portion of user-entered data for the first parameter and wholly or partially visually overlap each other when displayed;
serving, to the client device, the recoded web content including the plurality of different data entry fields in place of the initial data entry field;
receiving, from the client device, a response that includes separate portions of user-entered data for the first parameter from a user of the client device, wherein the separate portions of user-entered data respectively correspond to data received in the plurality of different data entry fields; and
creating a combined response that identifies an entirety of user-entered data for the first parameter by combining the separate portions of user-entered data from the received response in a manner that corresponds to a manner in which the web content was recoded to replace the initial data entry field with the plurality of different data entry fields;
wherein the performance of operations is done by an intermediary server system.

* * * * *